July 5, 1932.  W. W. RIEDEL  1,865,483

SHOCK ABSORBER

Filed July 23, 1930

INVENTOR
Walter W. Riedel
BY Spencer, Hardman & Zehr
ATTORNEYS

Patented July 5, 1932

1,865,483

UNITED STATES PATENT OFFICE

WALTER W. RIEDEL, OF DAYTON, OHIO, ASSIGNOR TO DELCO PRODUCTS CORPORATION, OF DAYTON, OHIO, A CORPORATION OF DELAWARE

SHOCK ABSORBER

Application filed July 23, 1930. Serial No. 470,037.

This invention relates to improvements in hydraulic shock absorbers.

It is among the objects of the present invention to provide a hydraulic shock absorber, adapted to control both the compression and rebound movements of a vehicle spring.

A further object of the invention is to provide a double acting shock absorber with a single valve, adapted to control the flow of fluid in either direction through the shock absorber.

Another object of the present invention is to provide a double acting hydraulic shock absorber with a single valve for controlling fluid flow through said shock absorber in both directions, said valves having springs of different tension, each of which act primarily to control the flow of fluid from the respective control chambers of the shock absorber, said springs, however, acting cooperatively to control all of the movements of the valve.

Further objects and advantages of the present invention will be apparent from the following description, reference being had to the accompanying drawing, wherein a preferred embodiment of one form of the present invention is clearly shown.

Figure 1:
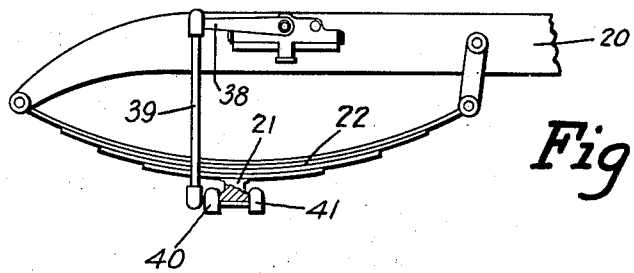
Fig. 1 is a fragmentary side view of a vehicle chassis having a shock absorber attached thereto equipped with the present invention.

Referring to the drawing, the numeral 20 designates the frame of the vehicle, which is supported upon the vehicle axle 21 by springs 22, only one of which is shown.

Figure 2:
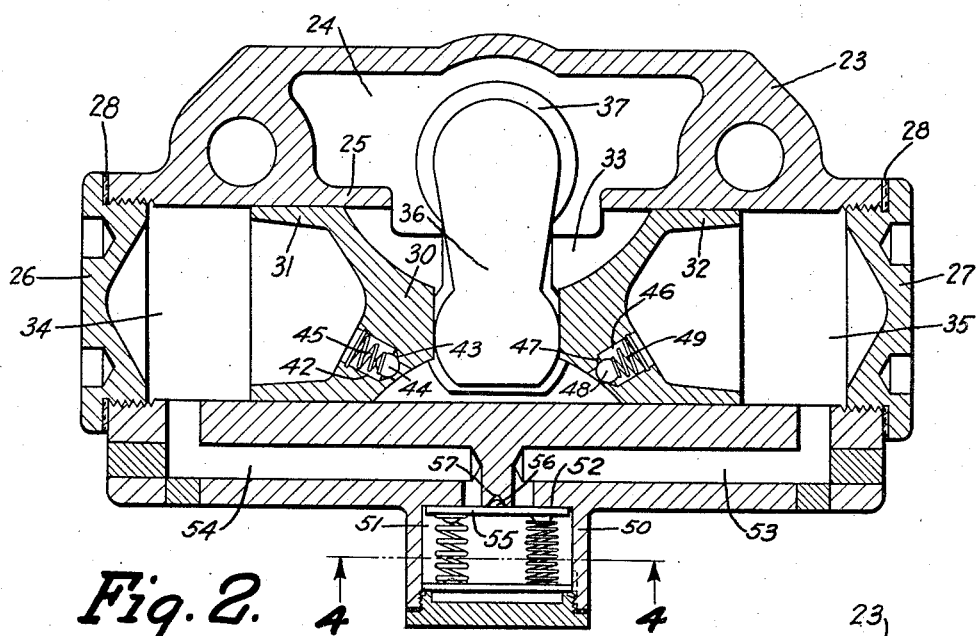
Fig. 2 is a longitudinal sectional view taken through the shock absorber and viewed from the rear thereof.

Upon the frame 20 the shock absorber is mounted, said shock absorber comprising a casing 23 providing a fluid reservoir 24 and a cylinder 25. The intermediate portion of the cylinder is in communication with the fluid reservoir 24, as shown in Fig. 2. The open ends of the cylinder are closed by screw plugs 26 and 27, each provided with a gasket 28.

Within the cylinder there is provided a piston 30 comprising two spaced head portions 31 and 32 tied together by a web portion 33. The piston head portion 31 forms a compression chamber 34 at the end of the cylinder closed by the screw cap 26. The piston head portion 32 forms a compression chamber 35 at the end of the cylinder closed by the screw cap 27. The compression chamber 34 may be termed the spring rebound control chamber, and the compression chamber 35 may be termed the spring compression control chamber. A space between the piston head portions 31 and 32 receives the rocker lever 36 which is provided by the rocker shaft 37 journalled in the casing 23. One end of the rocker shaft 37 extends outside the casing and has the shock absorber operating arm 38 provided thereon, the free end of said arm being swivelly attached to one end of the connecting link 39. The other end of said connecting link is swivelly attached to a bracket 40 which is secured to the axle 21 by the clamping member 41. A passage 42 in the piston head portion 31 has a valve seat 43 adapted to be engaged by the ball check valve 44, a spring 45 yieldably urging said ball check valve upon seat 43. A similar passage 46 is provided in the piston head portion 32, said passage having a valve seat 47 upon which ball check valve 48 is urged by the spring 49. Valves 44 and 48 may be termed the fluid replenishing valves. As their respective piston head portions move away from their respective cylinder heads, these valves may open to establish a flow of fluid into the respective compression chambers for purposes of replenishing the fluid supply due to losses caused by leaks past the piston or the like.

Figure 3:
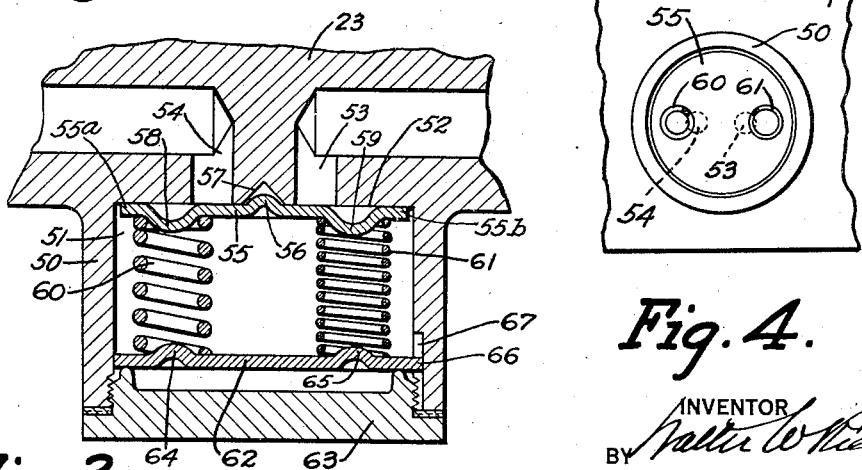
Fig. 3 is an enlarged, detail sectional view of the fluid flow controlling valve within the fluid chamber of the shock absorber.
Figure 4:
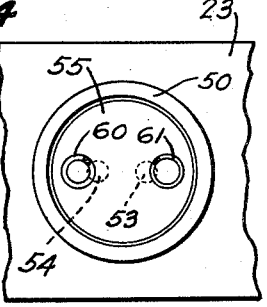
Fig. 4 is a detail sectional view taken substantially along the line 4—4 of Fig. 2.

An annular extension 50 on the casing 23 provides a valve chamber 51. The bottom wall or surface 52 of this chamber forms a valve seat. A duct 53 provides communication between the spring compression control chamber 35 and the valve chamber 51. A similar duct 54 provides communication between the spring rebound control chamber and the said valve chamber 51. A disc valve 55 engages the valve seat 52 to shut off communication between the two ducts 53 and 54 and the valve chamber 51. A hump 56 in the center of the disc valve 55 fits into a countersink 57 in the casing wall between ducts 53 and 54 whereby said valve 55 is substantially maintained in proper position on the valve seat surface 52 of the valve chamber 51. To one side of the center hub 56 and adjacent the periphery of the disc valve 55, a hump 58 is provided, while a similar hump 59 is provided on the opposite side of the center of the disc valve 55. These humps respectively receive the end convolution of springs 60 and 61, the opposite ends of the springs resting upon a plate 62 which is supported by the screw cover or cap 63, screw-threaded into the open end of the annular extension 50 of the casing. Plate 62 is provided with humps 64 and 65 which substantially maintain springs 60 and 61 respectively in proper position. In order to prevent rotation of the plate 62 relative to the extension 50, an ear 66 is provided on the plate 62 which extends into a groove 67 provided in the inner surface of the annular extension 50. It may be seen in Figs. 2 and 3 that the spring 60, which urges the disc valve 55 into engagement with the valve seat 52 adjacent the point of communication between the duct 54 from the spring rebound control chamber and the valve chamber 51, is of greater proportions and therefore of greater tension than the spring 61 which urges the valve 55 against seat 52 adjacent the point of communication between the duct 53 from the spring compression control chamber and the said valve chamber 51.

The operation of the device will now be described:

When the axle 21 is moved toward the frame 20 due to the road wheels of the vehicle (supported by the axle but not shown in the present drawing) striking an obstruction in the roadway, the link connection 39 with the shock absorber operating arm 38 will rotate said arm clockwise as regards Fig. 1, thus moving the piston toward the left as regards Fig. 1, or toward the right as regards Fig. 2, which, as has been mentioned, is a view from the rear side. As the piston 30 moves toward the right as regards Fig. 2, fluid within the spring compression control chamber 35 will have pressure exerted thereon, forcing it through the duct 53 against the disc valve 55. When this pressure is sufficiently high, the disc valve 55 will move against the effect of the springs 60 and 61 in the valve chamber 51, the disc valve 55 operating with a tilting movement, the edge designated by the numeral 55a forming the fulcrum upon which said disc valve moves. Spring 61 will primarily resist the movement of the valve inasmuch as it engages the disc valve 55 adjacent the port of entry of the duct 53, or a greater distance from the fulcrum point of the moving valve than where the spring 60 engages it. However spring 60 will assist spring 61 to resist the movement of the valve 55 away from the valve seat 52, still this added resistance of the spring 60 will be comparatively weak as compared to the resistance of spring 61 due to the fact that spring 60 engages the disc valve adjacent its fulcrum point in this instance. The valve having moved from its seat 52, fluid will flow from the duct 53 past the valve 55 into the duct 54 and thence into the enlarged spring rebound control chamber. The fluid flow past valve 55 is restricted and thus the movement of the piston toward the cylinder head 27 will be resisted, resisting thereby the compression movement of the vehicle spring 22.

As soon as the spring 22 has been flexed to the limit by this particular obstruction being met, it will have a tendency to return to its normal load position with a rebounding movement. This movement, however, is controlled by the shock absorber in that now the piston head portion 31 will be moved toward its cylinder head and thus a pressure is exerted upon the fluid within the spring rebound control chamber 34. Fluid will flow from chamber 34 through the duct 54 against the disc valve 55. When the pressure is sufficient, valve 55 will be moved, the portion marked 55b acting as the fulcrum point of the valve and spring 60 primarily resisting this movement, while spring 61 assists it. It may be seen that spring 60 being of greater tension than spring 61, a greater pressure will be required to move the valve in this instance than in the instance aforedescribed. Spring 61 will offer a slight resistance to this movement of the disc valve, the resistance being light due to the fact that spring 61 now engages the disc valve adjacent the fulcrum point. This action of the shock absorber resists the movement of vehicle spring 22 away from the frame 20.

From the aforegoing it may be seen that although the respective springs primarily control the movement of the disc valve in response to fluid pressure from the respective control chambers, due to their engagement of the disc valve relative to the fulcrum point of said valve in each instance, still, both valves will cooperate, one assisting the other to control the movement of the valve.

To vary the operation of the device, springs of different tension may be placed within the valve chamber 51, or a thicker or thinner plate 62 may be placed upon the screw cap 63, whereby the tension of the springs already provided will be altered to vary the operation of the shock absorber.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing providing a cylinder; a piston in said cylinder forming two compression chambers therein; a valve chamber; a duct leading from each compression chamber into the valve chamber; a disc-valve in said valve chamber; and springs engaging said disc-valve at diametrically opposite sides, yieldably urging said disc-valve to shut off communication between the ducts and the valve chamber.

2. A shock absorber comprising, in combination, a casing providing a cylinder; a piston in said cylinder forming two compression chambers therein; a valve chamber; a duct leading from each compression chamber into the valve chamber; a disc-valve in said valve chamber; and springs engaging the disc-valve, each spring adjacent a duct respectively so that a plane passing through the centers of the springs will align with a plane passing through the centers of the ducts, said springs yieldably urging the disc-valve to close the ducts.

3. A shock absorber comprising, in combination, a casing providing a cylinder; a piston in said cylinder forming two compression chambers therein; a valve chamber; a duct leading from each compression chamber into the valve chamber; a disc-valve in said valve chamber; a spring engaging the disc-valve adjacent one duct; another spring of greater tension than the aforementioned spring, engaging the disc-valve adjacent the other duct, said springs yieldably urging the disc-valve to close the ducts.

4. A shock absorber comprising, in combination, a casing providing a cylinder; a piston in said cylinder forming two compression chambers therein; a valve chamber; a duct leading from each compression chamber into the valve chamber; a disc valve in the valve chamber, said disc valve having diametrically opposite humps; a plate supported in the valve-chamber in spaced relation to the disc-valve, said plate having similar humps; and springs interposed between the disc-valve and plate, and fitting about the adjacent humps, said spring yieldably urging the disc-valve to close the ducts.

5. A shock absorber comprising, in combination, a casing providing a cylinder; a piston forming two compression chambers in said cylinder; a valve chamber; ducts leading from the respective compression chambers into the valve chamber; a disc-valve in the valve-chamber for normally shutting off communication between the ducts and said chamber; and springs of different tension engaging said disc-valve adjacent its peripheral edge and at diametrically opposite sides thereof, yieldably urging said disc-valve into normal position.

6. A shock absorber for controlling the compression and rebound movements of a vehicle spring, comprising, in combination, a casing providing a cylinder; a piston in said cylinder forming a spring compression control chamber at one end and a spring rebound control chamber at the other end of the cylinder; a valve-chamber; ducts leading from the respective control chambers into the valve chamber; a valve in the chamber normally cutting off communication between the ducts and the valve chamber; and springs, each of different tension than the other, yieldably urging the spring into normal position, the spring of greater tension primarily controlling the valve when it is moved by fluid pressure from the spring rebound control chamber.

7. A shock absorber for controlling the compression and rebound movements of a vehicle spring, comprising, in combination, a casing providing a cylinder; a piston in said cylinder forming a spring compression control chamber at one end and a spring rebound control chamber at the other end of the cylinder; a valve-chamber; ducts leading from the respective control chambers into the valve chamber; a valve in the chamber normally cutting off communication between the ducts and the valve chamber; and springs, each of different tension than the other, yieldably urging the spring into normal position, the spring of greater tension primarily controlling the valve when it is moved by fluid pressure from the spring rebound control chamber, the other spring primarily controlling the valve when moved by fluid pressure from the spring compression control chamber, both springs cooperating, however, to control movements of the valve.

8. A shock absorber for controlling the compression and rebound movements of a vehicle spring, comprising, in combination, a casing providing a cylinder; a piston in said cylinder forming a spring compression control chamber at one end and a spring rebound control chamber at the other end of the cylinder; a valve-chamber; ducts leading from the respective control chambers into the valve-chamber; two spaced plates in the valve-chamber, one of them normally shutting off communication between the respective ducts and said valve chamber; springs of different tension interposed between the plates, the spring of greater tension primarily resisting movement of the one plate due to fluid pressure in the spring rebound control chamber, the other spring primarily resisting movement of said plate due to fluid pressure in the spring compression control chamber, both springs, however, cooperating to resist all movements of the said plate due to fluid pressure in the ducts.

In testimony whereof I hereto affix my signature.

WALTER W. RIEDEL.